(12) United States Patent
Sugiyama et al.

(10) Patent No.: US 7,289,686 B2
(45) Date of Patent: Oct. 30, 2007

(54) OPTICAL MODULATOR

(75) Inventors: Masaki Sugiyama, Kawasaki (JP);
Kazuhiro Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/474,461

(22) Filed: Jun. 26, 2006

(65) Prior Publication Data
US 2007/0217729 A1    Sep. 20, 2007

(30) Foreign Application Priority Data
Mar. 17, 2006  (JP)  ............... 2006-073926

(51) Int. Cl.
*G02F 1/035* (2006.01)
(52) U.S. Cl. ............................................ 385/3
(58) Field of Classification Search ............ 385/3
See application file for complete search history.

(56) References Cited
U.S. PATENT DOCUMENTS 5,267,336 A * 11/1993 Sriram et al. ............. 385/2
6,853,758 B2 * 2/2005 Ridgway et al. .......... 385/2

2005/0180694 A1   8/2005 Sugiyama et al.
2006/0029319 A1 * 2/2006 Sugiyama .................. 385/1

FOREIGN PATENT DOCUMENTS

| JP | 2003-228033 | 8/2003 |
| JP | 2005-284129 | 10/2005 |
| WO | 2004/053574 A1 | 6/2004 |

* cited by examiner

*Primary Examiner*—Ellen E. Kim
(74) *Attorney, Agent, or Firm*—Bingham McCutchen LLP

(57) ABSTRACT

In an optical modulator according to the present invention, a Mach-Zehnder optical waveguide is formed on a substrate having an electro-optic effect, a signal electrode and an earth electrode are disposed along a pair of branching waveguides of the optical waveguide, and an electric signal is applied on the signal electrode to thereby modulate a light being propagated through the optical waveguide. At this time, a first region and a second region are set in an interacting portion where the light and the electric signal interacts to each other, to form a polarization inversion region in each of the set regions, and also, an arrangement pattern of the signal electrode is determined so that a modulation direction in each of the set regions is opposite to each other. As a result, it is possible to realize the optical modulator of simple configuration capable of realizing simultaneously the broad modulation band and the wavelength chirping suppression.

12 Claims, 10 Drawing Sheets

RELATED ART

RELATED ART

OPTICAL MODULATOR

BACKGROUND OF THE INVENTION

1. Field of the Invention

The present invention relates to an optical modulator used for an optical communication, and in particular, to a Mach-Zehnder optical modulator.

2. Description of the Related Art

For example, an optical waveguide device using an electro-optic crystal such as lithium niobate ($LiNbO_3$), lithium tantalate ($LiTaO_2$) or the like, is formed such that a metallic film is formed on a part of a crystal substrate, to be thermally diffused or to be proton exchanged in benzoic acid after patterning, so that an optical waveguide is formed, and thereafter, an electrode is disposed in the vicinity of the optical waveguide. As one of optical waveguide devices using the electro-optical crystals, there has been known a Mach-Zehnder optical modulator having an optical waveguide structure of branching interference type.

FIG. 7 is a top view showing a configuration example of a conventional Mach-Zehnder optical modulator. In this Mach-Zehnder optical modulator, an optical waveguide 110 is formed such that a titanium (Ti) film is formed on a substrate 101 to be patterned into a Mach-Zehnder shape, and thereafter, is heated at the required temperature for a required period of time to be thermally diffused. This optical waveguide 110 comprises: an incident waveguide 111; a branching section 112; branching waveguides 113a and 113b; a multiplexing section 114; and an emission waveguide 115, and a coplanar electrode 120 comprising a signal electrode 121 and an earth electrode 122 is disposed along the branching waveguides 113a and 113b. In the case where the substrate 101 of Z-cut is used, in order to utilize a change in refractive index due to an electric field in a Z-direction, the signal electrode 121 and the earth electrode 122 are arranged respectively just above the branching waveguide 113a. Further, in order to prevent lights being propagated through the branching waveguides 113a and 113b from being absorbed, the signal electrode 121 and the earth electrode 122 are formed on the substrate 101 via a buffer layer (not shown in the figure) consisting of oxide silicon ($SiO_2$) or the like.

In the case where the conventional Mach-Zehnder optical modulator as described above is driven at a high speed, the signal electrode 121 is earthed at one end thereof via a resistor (not shown in the figure) to be made a traveling wave electrode, and a high frequency electric signal S, such as a microwave or the like, is applied from through the other end of the signal electrode 121. At this time, each refractive index of the branching waveguides 113a and 113b is changed due to an electric field generated between the signal electrode 121 and the earth electrode 122. Therefore, a phase difference between the respective lights being propagated through the branching waveguides 113a and 113b is changed, so that a signal light whose intensity is modulated is output from the emission waveguide 115.

For the conventional Mach-Zehnder optical modulator as described above, it has been known that an optical response characteristic of broadband can be obtained, by changing a cross section of the signal electrode 121 to control the effective refractive index of the electric signal S, and by matching a propagation speed of the light and a propagation speed of the electric signal S with each other. However, the electric signal S being propagated through the signal electrode 121 has a problem in that a propagation loss thereof becomes larger as a frequency thereof becomes higher, and therefore, the modulation band for the signal light is restricted resulting in the difficulty of high speed modulation.

As a conventional technology relating to the broadband of the Mach-Zehnder modulator, as shown in FIG. 8 for example, there has been proposed a configuration in which, in an interacting portion of the light and the electric signal S, to a polarization direction of a certain length part of the substrate 101 from an input side, a polarization direction of the remaining part (surrounded with a broken line in the figure) is inverted (refer to Japanese Unexamined Patent Publication No. 2005-284129). According to this configuration, if the modulation in a non-inversion region where the polarization direction is not inverted is performed in a forward direction, the modulation in a direction opposite to the forward direction is performed in the polarization inversion region. As described in the above, since the loss of the electric signal S becomes larger as the frequency thereof becomes higher, the intensity of inverse modulation in the polarization inversion region is high at the low frequency, while being low at the high frequency. As a result, the modulation at the low frequency can be suppressed in the entire optical modulator, and therefore, the modulation band becomes broader.

Further, for the conventional Mach-Zehnder optical modulator, there has been known a phenomenon in which a wavelength of the light is fluctuated at the modulation time (wavelength chirping), and this wavelength chirping problematically causes the distortion of the waveform of the signal light after transmitted through a fiber.

Briefly explaining the wavelength chirping, in the optical modulator shown in FIG. 7, one of the two branching waveguides 113a and 113b is arranged below the signal electrode 121 and the other is arranged below the earth electrode 122. Under the signal electrode 121 and the earth electrode 122, the orientations of electric field are opposite to each other, so that the refractive index change of the one branching waveguide is positive while that of the other is negative. As a result, the phases of the respective lights being propagated through the branching waveguides 113a and 113b are changed, and when the respective lights are multiplexed, the intensity of the multiplexed light is modulated. However, an absolute value of the refractive index change at this time under the signal electrode 121 becomes larger than that under the earth electrode 122, resulting in that the phase modulation remains in an output light. This is the cause of the wavelength chirping.

As a conventional technology for suppressing the wavelength chirping as described above, as shown in FIG. 9 for example, there has been proposed a configuration in which the center of the interacting portion of the light and the electric signal is made to be a polarization inversion region, and the length of the waveguide passing through the polarization inversion region is made equal to the length of the waveguide passing through a non-inversion region (refer to the pamphlet of International Publication No. 2004-053574). In this configuration, an integral value of each of the refractive index changes in the branching waveguides 113a and 113b realizes the zero-chirping, since the absolute values of the refractive index changes become equal to each other. Further, there has also been proposed a configuration in which the signal electrode is branched into plural numbers (refer to Japanese Patent No. 3695708).

Moreover, as a conventional technology for realizing both of the above broadband and the zero-chirping, as shown in FIG. 10 for example, there has also been proposed a configuration in which a polarization inversion region is disposed to perform the inverted modulation, to thereby achieve the broadband, and also, a signal electrode is branched into two to be symmetrically arranged, to thereby realize the zero-chirping (refer to Japanese Unexamined Patent Publication No. 2005-284129).

However, the conventional Mach-Zehnder optical modulator of the configuration as shown in FIG. 10 has a problem in that it is difficult to perform the impedance matching before and after the signal electrode is branched into two. Further, since two terminal circuits for the signal electrodes are necessary, the configuration of the Mach-Zehnder optical modulator becomes complicated, resulting in implementation drawback.

SUMMARY OF THE INVENTION

The present invention has been accomplished in view of the above problems, and has an object to provide an optical modulator of simple configuration capable of realizing simultaneously the broad modulation band and the wavelength chirping suppression.

In order to achieve the above object, an optical modulator according to the present invention has a Mach-Zehnder configuration comprising: an optical waveguide of a Mach-Zehnder interferometer structure disposed on a substrate having an electro-optic effect; and a signal electrode and an earth electrode which are disposed along a pair of branching waveguides positioned between a branching section of the optical waveguide and a multiplexing section thereof, for applying an electric signal on the signal electrode to modulate a light being propagated through the optical waveguide. The substrate includes, in an interacting portion thereof where the lights being propagated through the pair of branching waveguides and the electric signal being propagated through the signal electrode interact to each other, a first region positioned on an input side of the light in a propagation direction and a second region positioned on an output side thereof. The first and second regions each includes a polarization inversion region which is a part thereof and whose polarization direction is inverted to a polarization direction of the remaining part thereof, and the previously set wavelength chirping can be obtained independently in each of the first and second regions. The signal electrode is arranged above either one of the pair of branching waveguides according to positions of the respective polarization inversion regions in the first and second regions, and also, an arrangement pattern of the signal electrode is determined so that a modulation direction in the second region is opposite to a modulation direction in the first region.

In the optical modulator of the above configuration, the light incident on the optical waveguide is branched into two lights in the branching section, to be respectively sent to the pair of branching waveguides. An electric field generated between the signal electrode and the earth electrode according to the electric signal being propagated through the signal electrode is applied on each of the branching waveguides, and the refractive index of each of the branching waveguides is changed due to an electro-optic effect by this electric field, so that phases of the lights being propagated through the branching waveguides are changed respectively. At this time, the polarization inversion regions are formed in the first region on the input side and in the second region on the output side, which are set in the interacting portion, and the arrangement pattern of the signal electrode is determined according to the positions of the polarization inversion regions, so that the modulations in opposite directions are performed in the first and second regions. Then, the lights propagated through the respective branching waveguides are multiplexed in the multiplexing section, so that an optical signal whose intensity is modulated is output at the required wavelength chirping.

According to the optical modulator of the present invention as described above, the first and second regions are set in the interactive portion to thereby form the polarization inversion regions in the respective regions, and also, the modulation directions in the respective regions are made opposite to each other. Thereby, it becomes possible to realize simultaneously the broad modulation band and the wavelength chirping suppression with a simple configuration.

Other objects, features and advantages of the present invention will become apparent from the following explanation of the embodiments, in conjunction with the appended drawings.

DESCRIPTION OF THE PREFERRED EMBODIMENTS

Figure 1:
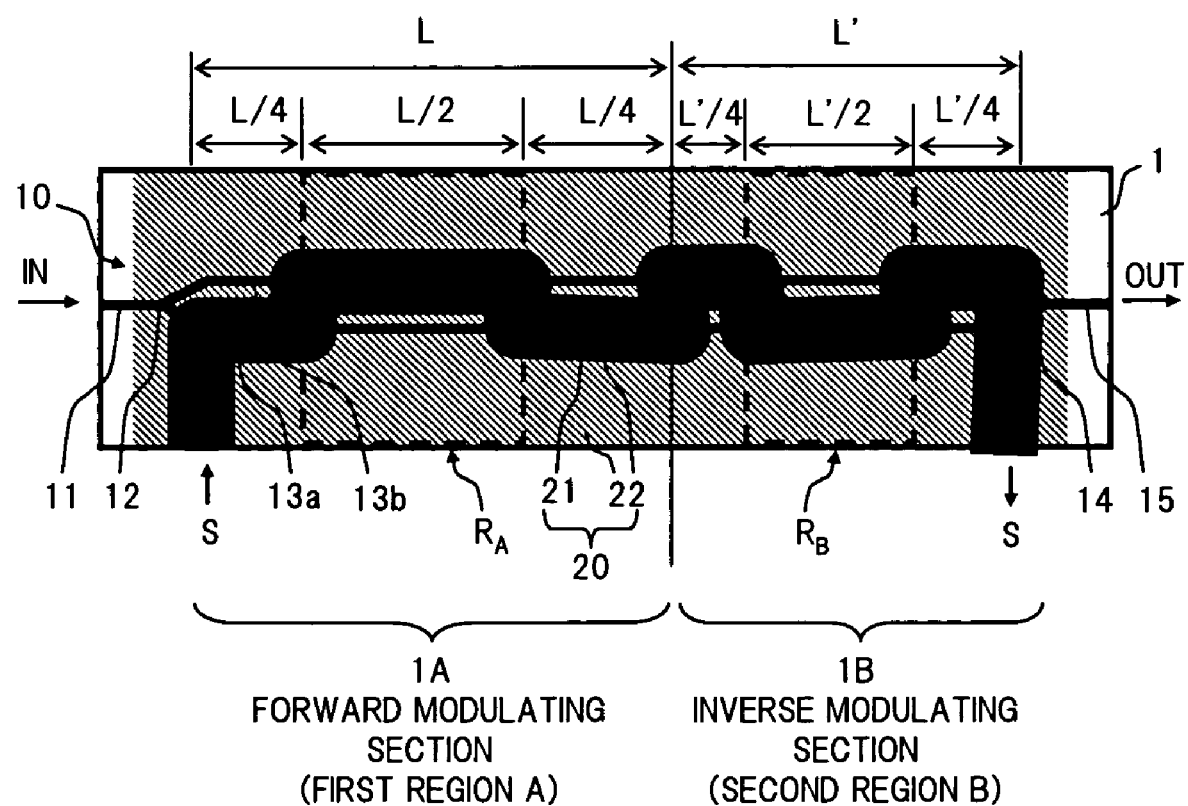
FIG. 1 is a plan view showing a configuration of a Mach-Zehnder optical modulator according to a first embodiment of the present invention.

There will be described embodiments for implementing the present invention, with reference to the accompanying drawings. The same reference numerals denote the same or equivalent parts in all drawings.

FIG. 1 is a plan view showing a configuration of a Mach-Zehnder optical modulator according to a first embodiment of the present invention.

In FIG. 1, the optical modulator in the present embodiment comprises a substrate 1 which has an electro-optic effect, a Mach-Zehnder optical waveguide 10 formed on the substrate 1, and a coplanar electrode 20 formed on the surface of the substrate 1.

The substrate 1 is formed using, for example, a Z-cut LiNbO₃ substrate or the like, in which, for a region (refer to as an interacting portion hereunder) where a light being propagated through the optical waveguide 10 and a high frequency electric signal S being propagated through the coplanar electrode 20 interact to each other, a first region A extending from an input end of the light to the length L in a lengthwise direction (propagation direction of the light) is made to be a forward modulating section 1A, and the remaining second region B is made to be an inverse modulating section 1B. Incidentally, herein, the length of the region B in the lengthwise direction is L'. In the forward modulating section 1A and the inverse modulating section 1B, polarization inversion regions $R_A$ and $R_B$ which are surrounded with broken lines in the figure, are respectively formed, so that the zero-chirping is realized independently in each of the forward modulating section 1A and the inverse modulating section 1B.

The polarization inversion region $R_A$, which has the length of ½ times of the total length L of the region A in the propagation direction of the light, is arranged on the approximate center of the region A, and the polarization inversion region $R_B$, which has the length of ½ times of the total length L' of the region B in the propagation direction of the light, is arranged on the approximate center of the region B. Incidentally, in a direction vertical to the propagation direction of the light, the polarization inversion region $R_A$ has the length capable of including a branching waveguide 13a (to be described later) of the optical waveguide 10, and the polarization inversion region $R_B$ has the length capable of including a branching waveguide 13b (to be descried later) of the optical waveguide 10. Each of the polarization inversion regions $R_A$ and $R_B$ can be formed, for example, by applying a high pulse field on the substrate 1 which has been patterned with resist or the like.

The optical waveguide 10 includes an incident waveguide 11, a branching section 12, the branching waveguides 13a and 13b, a multiplexing section 14 and an emission waveguide 15, to constitute a Mach-Zehnder interferometer. The optical waveguide 10 is formed on a -Z plane of the substrate 1 by the processing of thermal diffusion, proton exchange or the like in the same manner as in the conventional technology. An optical incident end IN (one end positioned on the left side in FIG. 1) of the incident waveguide 11 and an optical emission end OUT (one end positioned on the right side in FIG. 1) of the emission waveguide 15 respectively reach opposing side faces of the substrate 1.

The coplanar electrode 20 includes a signal electrode 21 and an earth electrode 22. The signal electrode 21 is patterned to be of a required shape, so as to pass over, for the region A, the branching waveguide 13b in the polarization inversion region $R_A$ while passing over the branching waveguide 13a in the region other than the polarization inversion region $R_A$, and also so as to pass over, for the region B, the branching waveguide 13a in the polarization inversion region $R_B$ while passing over the branching waveguide 13b in the region other than the polarization inversion region $R_B$. On the other hand, the earth electrode 22 is patterned to be of a required shape, with a fixed distance from the signal electrode 21, so as to pass over, for the region A, the branching waveguide 13a in the polarization inversion region $R_A$ while passing over the branching waveguide 13b in the region other than the polarization inversion region $R_A$, and also so as to pass over, for the region B, the branching waveguide 13b in the polarization inversion region $R_B$ while passing over the branching waveguide 13a in the region other than the polarization inversion region $R_B$. The signal electrode 21 is earthed via a resistor (not shown in the figure) at one end thereof positioned on the upper right in the figure, to be made a traveling wave electrode, and the high frequency electric signal S corresponding to modulation data is applied on the signal electrode 21 via the other end thereof positioned on the lower left in the figure. A cross section of the signal electrode 21 is designed so as to satisfy a speed matching condition between the light being propagated through the optical waveguide 10 and the high frequency electric signal S. To be specific, for example, in the case where the modulation at 40 Gb/s is performed, the cross section of the signal electrode 21 is designed so that a speed of the light being propagated through the optical waveguide 10 reaches 80 to 100% of a speed of the high frequency electric signal S being propagated through the signal electrode 21.

Incidentally, it is desirable to form, between the coplanar electrode 20 and the surface of the substrate 1, a buffer layer for preventing the light being propagated through the optical waveguide 10 from being absorbed by the coplanar electrode 20. For this buffer layer, $SiO_2$ of 0.2 to 1 μm thickness can be used, for example.

Next, there will be described an operation of the optical modulator in the first embodiment.

In the Mach-Zehnder optical modulator as described above, a continuous light given from the outside to the incident waveguide 11 is branched into two lights in the branching section 12, to be respectively sent to the branching waveguides 13a and 13b. Each of the branching waveguides 13a and 13b is applied with an electric field which is generated between the signal electrode 21 and the earth electrode 22 according to the high frequency electric signal S traveling in the signal electrode 21, and the refractive index of each of the branching waveguides 13a and 13b is changed due to an electro-optic effect caused by the electric field. As a result, phases of the lights being propagated through the branching waveguides 13a and 13b are respectively changed.

At this time, in the lengthwise direction (total length L) of the forward modulating section 1A, if the designing is made such that the length of the polarization inversion region $R_A$ is approximately equal to the lengths of the non-inversion regions, that is, such that, in the configuration shown in FIG. 1, the length of each of the non-inversion regions positioned on the front side and on the rear side of the polarization inversion region $R_A$ is L/4 and the length of the polarization inversion region $R_A$ is L/2, the phase of the light being propagated through the branching waveguide 13a of the forward modulating section 1A is changed by $\theta_a$ shown in the equation (1), while the phase of the light being propagated through the branching waveguide 13b of the forward modulating section 1A is changed by $\theta_b$ shown in the equation (2).

$$\theta_a = (+\Delta n_S) \cdot L/4 + (+\Delta n_G) \cdot L/2 + (+\Delta n_S) \cdot L/4 = (\Delta n_S + \Delta n_G) \cdot L/2 \tag{1}$$

$$\theta_b = (-\Delta n_G) \cdot L/4 + (-\Delta n_S) \cdot L/2 + (-\Delta n_G) \cdot L/4 = (\Delta n_S + \Delta n_G) \cdot L/2 \tag{2}$$

Note, $\Delta n_S$ is a refractive index change amount of the branching waveguide positioned below the signal electrode 21, and $\Delta n_G$ is a refractive index change amount of the branching waveguide positioned below the earth electrode 22.

As is apparent from the equations (1) and (2), the phases of the lights being propagated through the respective branching waveguides 13a and 13b of the forward modulating section 1A are respectively changed by $(+\Delta n_S) \cdot L/2$ and $(-\Delta n_G) \cdot L/2$ in the non-inversion region, and are respectively changed by $(+\Delta n_G) \cdot L/2$ and $(-\Delta n_S) \cdot L/2$ in the polarization inversion region $R_A$. Accordingly, the phases of the lights which pass through the branching waveguides 13a and 13b to reach an output end of the forward modulating section 1A are respectively changed by $+(\Delta n_S + \Delta n_G) \cdot L/2$ and $-(\Delta n_S + \Delta n_G) \cdot L/2$, and therefore, the phase modulations in which absolute values are equal to each other and signs thereof are inverted to each other, are respectively performed. Therefore, the wavelength chirping does not occur in the forward modulating section 1A, resulting in the zero-chirping.

Figure 2:
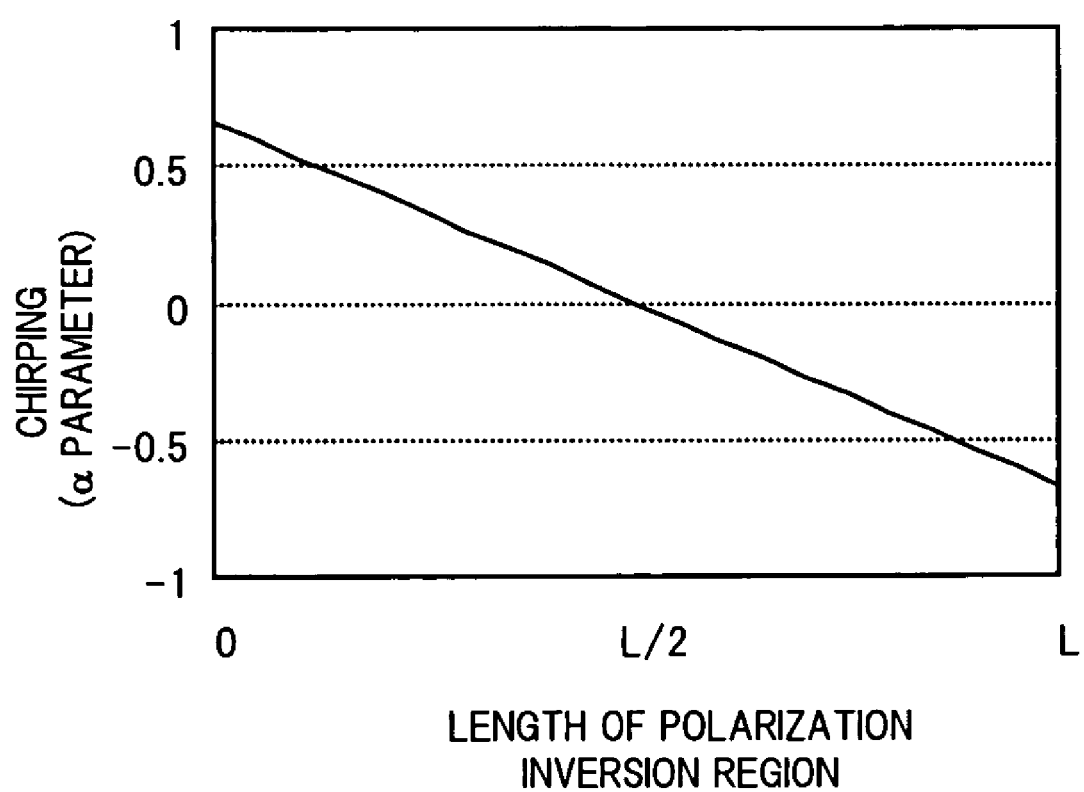
FIG. 2 is a graph showing one example of a relationship between the length of a polarization inversion region and the wavelength chirping in the first embodiment.

FIG. 2 is a graph exemplarily showing a relationship between the length of the polarization inversion region $R_A$ and the occurred wavelength chirping. Herein, a ratio of the length of the polarization inversion region $R_A$ to the total length L of the forward modulating section 1A is represented in a transverse axis, and a value of α parameter indicating the occurred wavelength chirping is represented in a longitudinal axis. It is understood from FIG. 2 that the value of α parameter becomes 0 and as a result, the wavelength chirping does not occur, when the length of the polarization inversion region $R_A$ is ½ times of the total length L, that is, the length of the polarization inversion region $R_A$ is equal to the length of the non-inversion region.

Further, similarly to the forward modulating section 1A, for the lengthwise direction (total length L') of the inverse modulating section 1B, if the designing is made such that the length of the polarization inversion region $R_B$ is approximately equal to the length of the non-inversion region, the phase of the light being propagated through the branching waveguide 13a of the inverse modulating section 1B is changed by $θ_{a'}$ shown in the equation (1)', while the phase of the light being propagated through the branching waveguide 13b of the inverse modulating section 1B is changed by $θ_{b'}$ shown in the equation (2)'.

$$θ_{a'} = (+\Delta n_G) \cdot L'/4 + (+\Delta n_S) \cdot L'/2 + (+\Delta n_G) \cdot L'/4 = (\Delta n_S + \Delta n_G) \cdot L'/2 \quad (1)'$$

$$θ_{b'} = (-\Delta n_S) \cdot L'/4 + (-\Delta n_G) \cdot L'/2 + (-\Delta n_S) \cdot L'/4 = -(\Delta n_S + \Delta n_G) \cdot L'/2 \quad (1)'$$

As is apparent from the equations (1)' and (2)', the phases of the lights being propagated through the branching waveguides 13a and 13b of the inverse modulating section 1B are respectively changed by $(+\Delta n_G) \cdot L/2$ and $(-\Delta n_S) \cdot L/2$ in the non-inversion region, and are respectively changed by $(+\Delta n_S) \cdot L/2$ and $(-\Delta n_G) \cdot L/2$ in the polarization inversion region $R_B$. Accordingly, the phases of the lights which pass through the branching waveguides 13a and 13b to reach an output end of the forward modulating section 1B are respectively changed by $+(\Delta n_S + \Delta n_G) \cdot L'/2$ and $-(\Delta n_S + \Delta n_G) \cdot L'/2$, and therefore, the phase modulations in which absolute values are equal to each other and signs thereof are inverted to each other, are respectively performed. Therefore, the wavelength chirping does not occur also in the forward modulating section 1B, resulting in the zero-chirping.

In the present optical modulator, since the coplanar electrode 20 is patterned so that a modulation direction in the region B positioned on an optical output side of the interacting portion is opposite to a modulation direction in the region A positioned on an optical input side of the interacting portion, the modulation band is made broader, in addition to the realization of zero-chirping in the forward modulating section 1A and in the inverse modulating section 1B. Namely, the high frequency electric signal S input to the signal electrode 21 is attenuated while being propagated through the signal electrode 21, and the attenuation thereof becomes larger at the high frequency. However, the modulation direction in the interacting portion is made to be the forward modulation in the region A and also is made to be the inverse modulation in the region B, so that the intensity of the inverse modulation in the region B is high at the low frequency while being low at the high frequency. As a result, the modulation at the low frequency can be suppressed in the entire optical modulator, so that the modulation band becomes broader.

Figure 3:
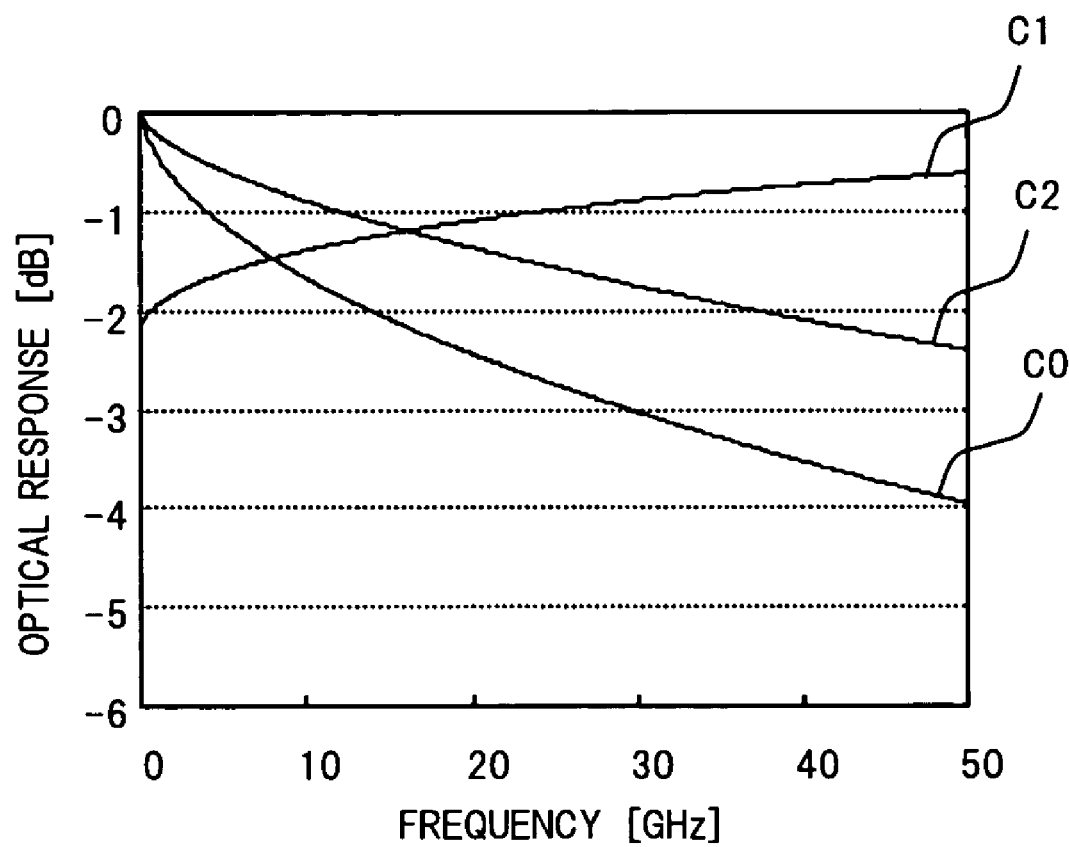
FIG. 3 is a graph showing one example of an optical response characteristic to a frequency of an electric signal in the first embodiment.

FIG. 3 shows one example of an optical response characteristic to the frequency of the electric signal S.

In FIG. 3, the curve C0 represents a frequency characteristic of optical output in a conventional optical modulator in which the inverse modulation is not performed on an output side of an interacting portion. Contrary to this, the curve C1 represents a frequency characteristic of inverse modulation component in the present optical modulator, and by performing such inverse modulation, a frequency characteristic of optical output in the present optical modulator is represented by the curve C2, to become broader compared with the conventional curve C0. According to the above Mach-Zehnder optical modulator whose modulation band is broader, it becomes possible to cover 3 dB band at 30 GHz or above, which is required for commercially available optical modulators of 40 Gb/s.

As described in the above, the lights which are respectively propagated through the branching waveguides 13a and 13b to be phase modulated in the forward modulating section 1A and in the inverse modulating section 1B, are multiplexed in the multiplexing section 14, so that an optical signal whose intensity is modulated is output from the emission waveguide 15.

Here, there will be described a ratio of the length of the forward modulating section 1A and a ratio of the length of the inverse modulating section 1B.

Figure 4:
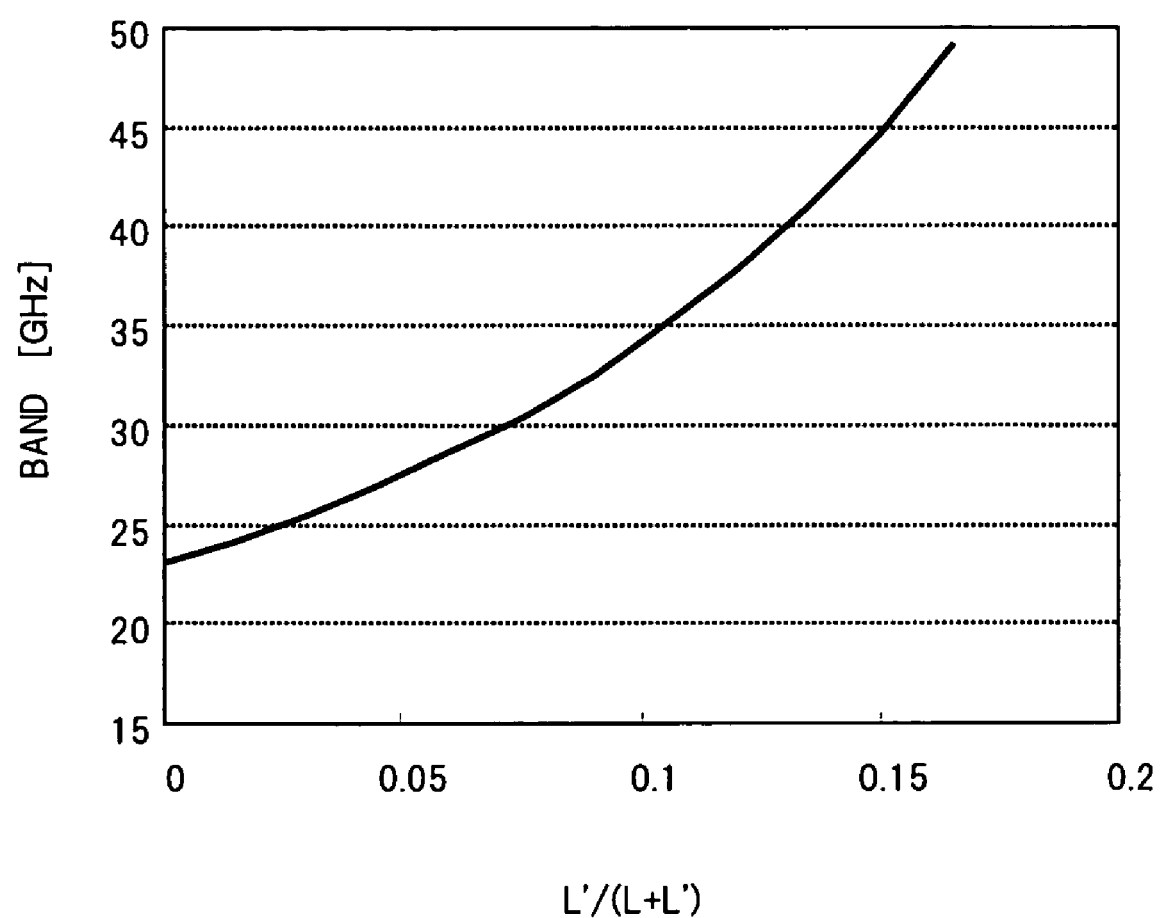
FIG. 4 is a graph showing one example of a modulation band for when a ratio of the length of an inverse modulating section to the total length of the interacting portion in the first embodiment.

FIG. 4 shows one example of conditions of modulation band for when the ratio (L'/(L+L')) of the length of the inverse modulating section 1B to the total length of the interacting portion is changed. As shown in FIG. 4, as the ratio of the length of the inverse modulating section 1B is increased, the modulation band becomes broader. However, if the ratio of the length of the inverse modulating section 1B is increased to some extent, the modulation is hardly performed at the low frequency. Therefore, the ratio of the length of the inverse modulating section 1B for realizing the broadband needs to be optimally designed, in view of the required modulation factor.

As described in the above, according to the first embodiment, the first region A positioned on the input side of the interacting portion is made to be the forward modulating section 1A while the second region B positioned on the output side thereof being made to be the inverse modulating section 1B, and also, the zero-chirping in each of the modulating sections 1A and 1B is achieved independently. Therefore, it becomes possible to provide the Mach-Zehnder optical modulator of a simple configuration capable of simultaneously realizing the broad modulation band and the zero-chirping.

Incidentally, in the first embodiment, the signal electrode 21 is arranged above the branching waveguide 13b in the polarization inversion region $R_A$ and above the branching waveguide 13a in the non-inversion region, in the forward modulating section 1A, and is arranged above the branching waveguide 13a in the polarization inversion region $R_B$ and above the branching waveguide 13b in the non-inversion region, in the inverse modulating section 1B. However, it is surely possible to make the arrangement of the signal electrode 21 in the polarization inversion region and in the non-inversion region in each of the modulating sections to be in reverse to the above described arrangement.

Further, the lengths of the polarization inversion regions $R_A$ and $R_B$ are respectively set at ½ times of the total lengths L of the forward modulating section 1A and at ½ times of the total length L' of the inverse modulating section 1B, so as to realize the zero-chirping. However, for example in the case where an electro-optic constant of each of the polarization inversion regions $R_A$ and $R_B$ is different from an electro-optic constant of the non-inversion region, it is possible to realize the zero-chirping by adjusting the length of each of the polarization inversion regions $R_A$ and $R_B$ according to such a difference in electro-optic constant.

Next, there will be described a second embodiment of the present invention.

Figure 5:
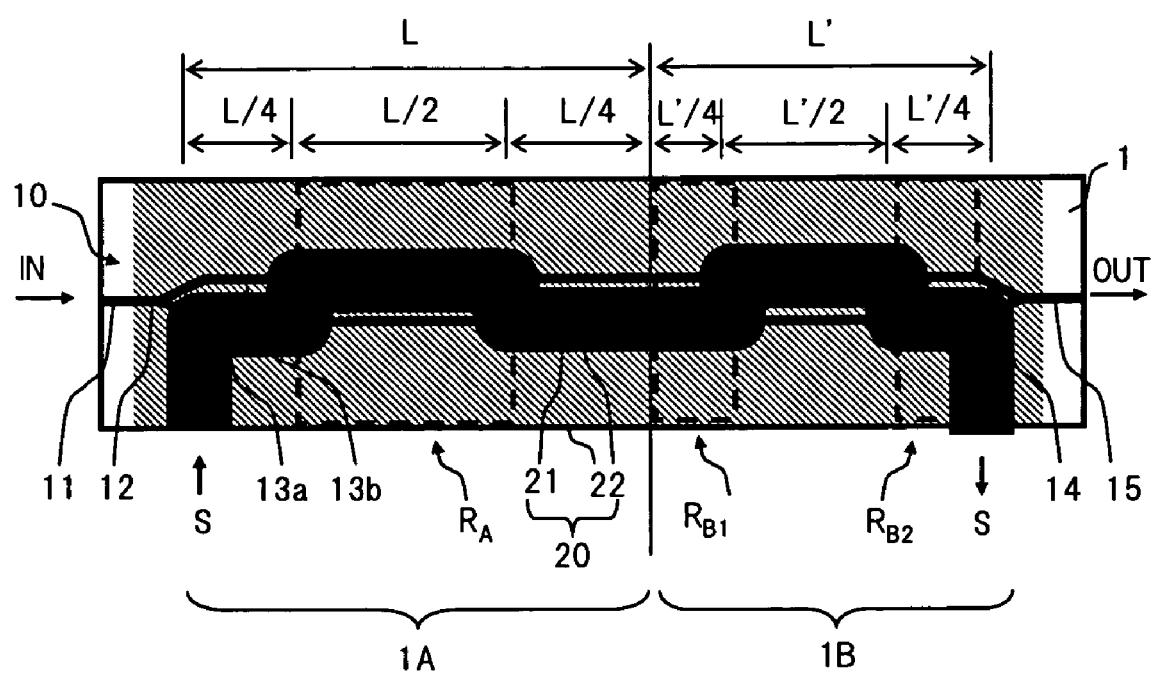
FIG. 5 is a plan view showing a configuration of a Mach-Zehnder optical modulator according to a second embodiment of the present invention.

FIG. 5 is a plan view showing a configuration of a Mach-Zehnder optical modulator according to the second embodiment of the present invention.

In FIG. 5, the configuration of the present embodiment differs from that of the first embodiment in that the arrangement of the polarization inversion region in the inverse modulating section 1B is modified to thereby achieve the simplification of the arrangement pattern of the signal electrode 21. To be specific, a polarization inversion region $R_{B1}$ is formed on a position extending to the length of L'/4 from one end of the inverse modulating section 1B, which is in contact with the forward modulating section 1A, and also, a polarization inversion region $R_{B2}$ of L'/4 length is formed so as to face the polarization inversion region $R_{B1}$ via a non-inversion region of L'/2 length. Then, the pattern of the coplanar electrode 20 is modified such that, in each of the polarization inversion regions $R_{B1}$ and $R_{B2}$, the signal electrode 21 is arranged above the branching waveguide 13a and the earth electrode 22 is arranged above the branching waveguide 13b, whereas, in the non-inversion region positioned between the respective polarization inversion regions $R_{B1}$ and $R_{B2}$, the signal electrode 21 is arranged above the branching waveguide 13b and the earth electrode 22 is arranged above the branching waveguide 13a.

According to the Mach-Zehnder optical modulator of the above configuration, the function and effect similar to those in the first embodiment can be achieved, and also, there is no longer necessary to switch the arrangement pattern of the signal electrode 21 in a boundary portion between the forward modulating section 1A and the inverse modulating section 1B, from the position above the branching waveguide 13a to the position above the branching waveguide 13b. Therefore, in the entire optical modulator, the traveling number of the signal electrode 21 between the branching waveguides 13a and 13b is decreased from three times to two times. By simplifying the arrangement pattern of the signal electrode 21, an improvement effect of propagation property (for example, loss, reflection and the like) of the electric signal S can be expected, and therefore, it becomes possible to further extend the modulation band.

Figure 6:
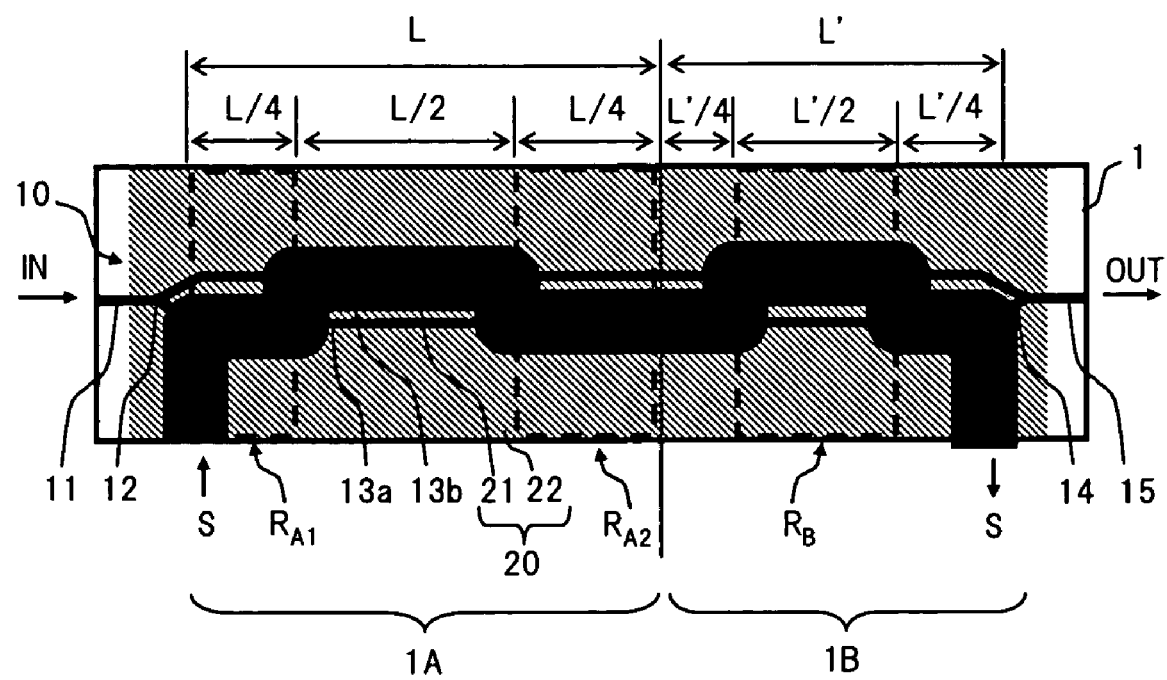
FIG. 6 is a plan view showing another application example related to the second embodiment.
Figure 7:
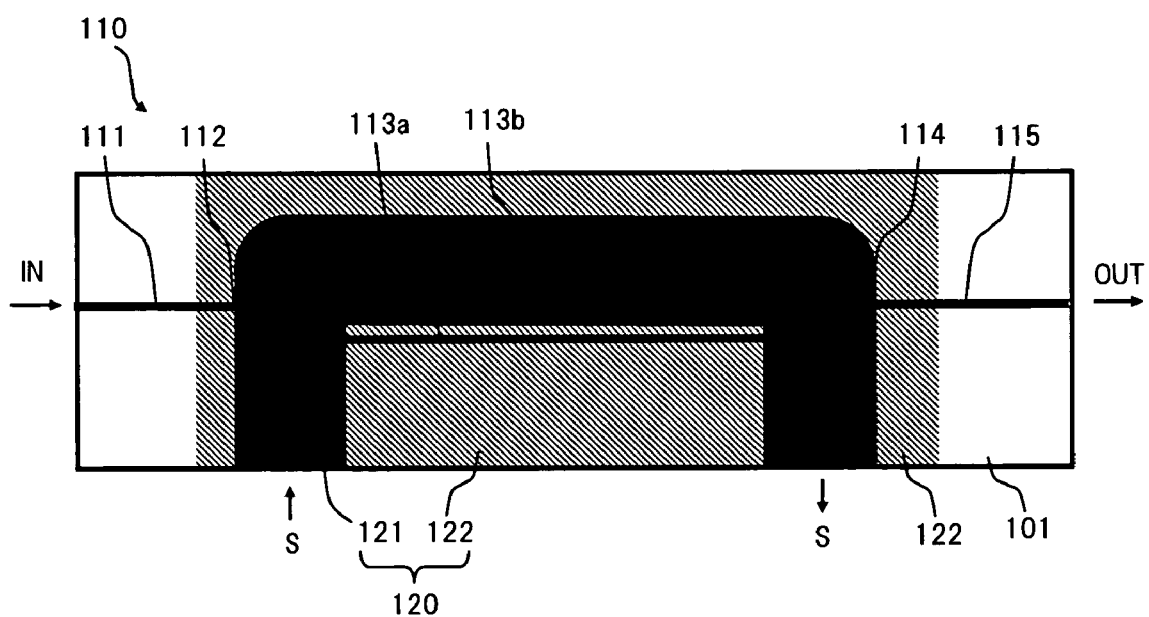
FIG. 7 is a top view showing a configuration of a conventional Mach-Zehnder optical modulator.
Figure 8:
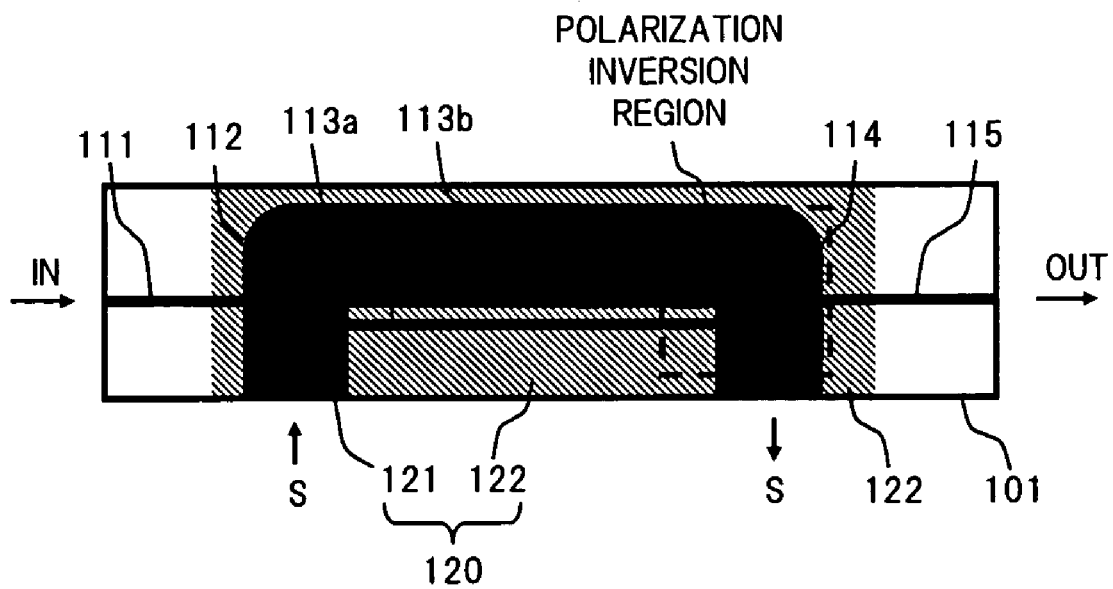
FIG. 8 is a top view showing a known configuration example in which the broadband is achieved, related to FIG. 7.
Figure 9:
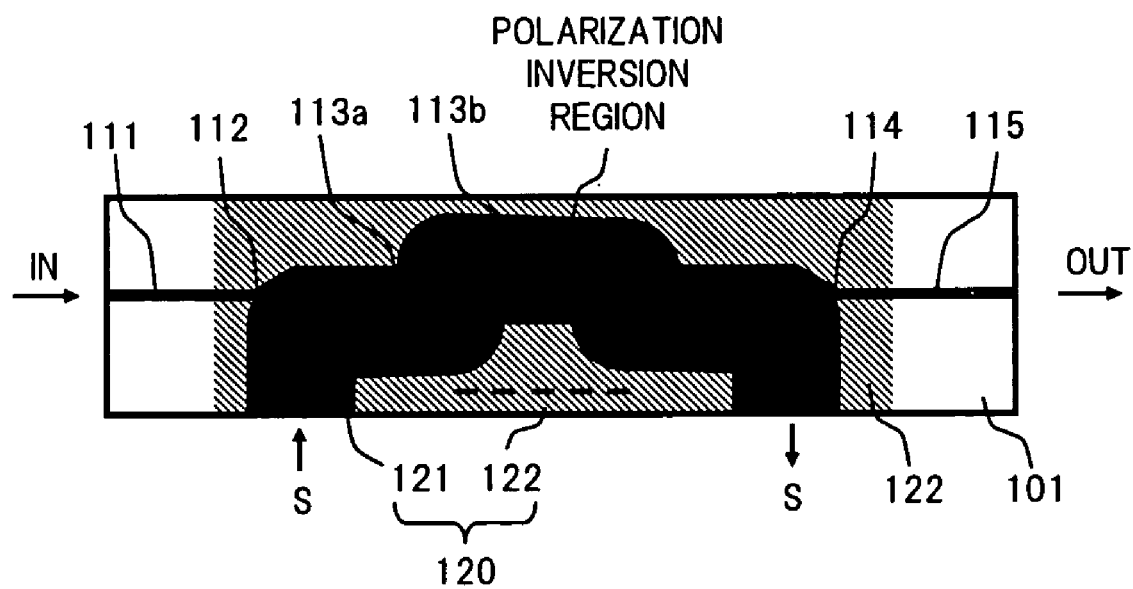
FIG. 9 is a top view showing a known configuration example in which the zero-chirping is realized, related to FIG. 7.
Figure 10:
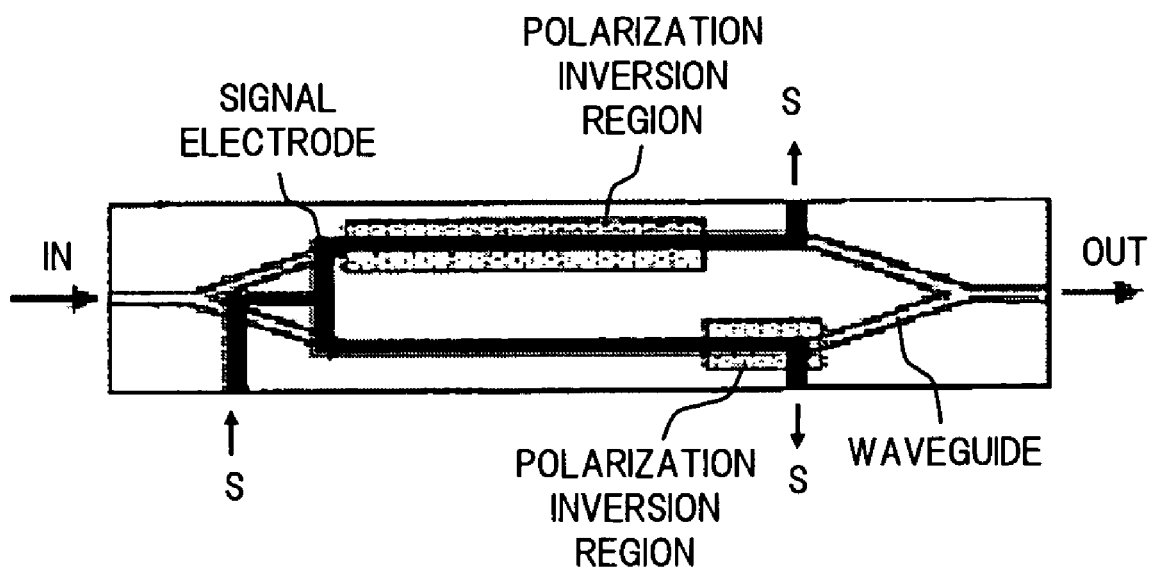
FIG. 10 is a top view showing a know configuration example in which the broadband and the zero-chirping are realized, related to FIG. 7.

In the second embodiment, there has been shown one example in which the arrangement of the polarization inversion region of the inversion modulating section 1B is modified to thereby achieve the simplicity of the signal electrode pattern. However, as shown in FIG. 6 for example, it is also possible to simplify the signal electrode pattern, by modifying the arrangement of the polarization inversion region of the forward modulating section 1A to form polarization inversion regions $R_{A1}$ and $R_{A2}$ on both end portions in the lengthwise direction of the forward modulating section 1A. In the configuration example of FIG. 6, a difference between the length (L/4) of each of the polarization inversion regions $R_{A1}$ and $R_{A2}$ of the forward modulating section 1A, and the length (L'/2) of the polarization inversion region $R_B$ of the inverse modulating section 1B, becomes smaller than that in the configuration example of FIG. 5. Therefore, the respective polarization regions $R_{A1}$, $R_{A2}$ and $R_B$ can be easily formed on the substrate 1, so that the manufacturing performance of the optical modulator can be improved.

Further, in each of the first and second embodiments, the lengths of the polarization inversion regions of the forward modulating section 1A and of the inverse modulating section 1B are made to be L/2 and L'/2, to thereby realize the zero-chirping in the respective modulating sections. However, as shown in FIG. 2, it is also possible to adopt an application for realizing the Mach-Zehnder optical modulator corresponding to a required α parameter by setting the lengths of the polarization inversion regions of the forward modulating section 1A and of the inverse modulating section 1B at the lengths other than L/2 and L'/2, taking notice that a parameter indicating a chirping amount can be arbitrarily set within a range of −0.7 to +0.7 by changing the length of the polarization inversion region within a range of 0 to L.

Moreover, in each of the first and second embodiments, there has been shown the configuration example in which the branching waveguides 13a and 13b are arranged in parallel to each other, as the Mach-Zehnder optical waveguide 10. However, the branching waveguides 13a and 13b in the present invention may be arranged so as not to be in parallel to each other, if optical path lengths thereof are substantially equal to each other.

What is claimed is:

1. An optical modulator of Mach-Zehnder type comprising: an optical waveguide of a Mach-Zehnder interferometer structure disposed on a substrate having an electro-optic effect; and a signal electrode and an earth electrode disposed along a pair of branching waveguides positioned between a branching section of said optical waveguide and a multiplexing section thereof, for applying an electric signal on said signal electrode to modulate a light being propagated through said optical waveguide, wherein said substrate includes, in an interacting portion thereof where the lights being propagated through said pair of branching waveguides and the electric signal being propagated through said signal electrode interact to each other, a first region positioned on an input side of the light in a propagation direction and a second region positioned on an output side thereof;

said first and second regions each includes a polarization inversion region which is a part thereof and whose polarization direction is inverted to a polarization direction of the remaining part thereof, and the previously set wavelength chirping can be obtained independently in each of said first and second regions; and said signal electrode is arranged above either one of said pair of branching waveguides according to positions of the respective polarization inversion regions in said first and second regions, and also, an arrangement pattern of said signal electrode is determined so that a modulation direction in said second region is opposite to a modulation direction in said first region.

2. An optical modulator according to claim 1,
wherein, in each of said first and second regions, the length of said polarization inversion region in the propagation direction of the light is set so that, for the light being propagated through each of said pair of branching waveguides, a phase change in said polarization inversion region and a phase change in the region other than said polarization inversion region are in a relationship in which absolute values of the phase changes are equal to each other and signs thereof are inverted to each other, and the wavelength chirping in each region reaches approximate zero.

3. An optical modulator according to claim 2, wherein, in each of said first and second regions, a ratio of the length of said polarization inversion region in the propagation direction of the light is set at approximate ½ times of the total length of each of said first and second regions.

4. An optical modulator according to claim 1, wherein the total length of said first region in the propagation direction of the light is longer than the total length of said second region in the propagation direction of the light.

5. An optical modulator according to claim 1, wherein said first and second regions each includes said polarization inversion region on the center portion thereof in the propagation direction of the light.

6. An optical modulator according to claim 1, wherein said polarization inversion region which is disposed in at least one of said first and second regions, is divided into a plurality of small regions, and said plurality of small regions are arranged along the propagation direction of the light.

7. An optical modulator according to claim 6, wherein said first region includes, in the propagation direction of the light, said polarization inversion region on the center portion thereof and both end portions thereof are made to be non-inversion regions, and said second region includes, in the propagation direction of the light, said polarization inversion regions each of which is divided into said small regions at both end portions thereof and the center portion thereof is made to be a non-inversion region.

8. An optical modulator according to claim 6, wherein said first region includes, in the propagation direction of the light, said polarization inversion regions each of which is divided into said small regions on both end portions thereof and the center portion thereof is made to be a non-inversion region, and said second region includes, in the propagation direction of the light, said polarization inversion region on the center portion thereof and both end portion thereof are made to be non-inversion regions.

9. An optical modulator according to claim 1, wherein said signal electrode is determined with an arrangement pattern thereof, so as to pass over one of said branching waveguides in the polarization inversion region of said first region, to pass over the other branching waveguide in the region other than the polarization inversion region of said first region, to pass over the other branching waveguide in the polarization inversion region of said second region, and to pass over the one branching waveguide in the region other than the polarization inversion region of said second region.

10. An optical modulator according to claim 1, wherein a speed of the light being propagated through each of said branching waveguides is 80 to 120% of a speed of the electric signal being propagated through said signal electrode.

11. An optical modulator according to claim 1, wherein signal electrode and said earth electrode are disposed on the surface of said substrate via a buffer layer.

12. An optical modulator according to claim 11, wherein said substrate is a Z-cut lithium niobate substrate.

\* \* \* \* \*